United States Patent
Ehlers et al.

(10) Patent No.: US 6,814,284 B2
(45) Date of Patent: Nov. 9, 2004

(54) ENHANCEMENT ANTENNA FOR ARTICLE IDENTIFICATION

(75) Inventors: Gerald L. Ehlers, Linden, VA (US); Thomas G. Lavedas, Clifton, VA (US)

(73) Assignee: Raytheon Company, Waltham, MA (US)

( * ) Notice: Subject to any disclaimer, the term of this patent is extended or adjusted under 35 U.S.C. 154(b) by 0 days.

(21) Appl. No.: 10/358,455

(22) Filed: Feb. 4, 2003

(65) Prior Publication Data

US 2003/0146839 A1 Aug. 7, 2003

Related U.S. Application Data

(60) Provisional application No. 60/354,398, filed on Feb. 4, 2002.

(51) Int. Cl.[7] .............................................. G06F 17/60
(52) U.S. Cl. ........................ 235/388; 235/383; 235/492
(58) Field of Search ................................ 235/385, 383, 235/492, 375; 343/748; 705/22, 28, 20

(56) References Cited

U.S. PATENT DOCUMENTS

| | | | |
|---|---|---|---|
| 4,344,064 A | | 8/1982 | Bitler et al. ................. 338/334 |
| 4,646,090 A | | 2/1987 | Mawhinney .................. 342/44 |
| 4,673,932 A | * | 6/1987 | Ekchian et al. .......... 340/10.32 |
| 5,430,441 A | * | 7/1995 | Bickley et al. ............ 340/10.2 |
| 5,450,492 A | | 9/1995 | Hook et al. .................... 380/28 |
| 5,521,601 A | * | 5/1996 | Kandlur et al. ............... 342/44 |
| 5,565,858 A | * | 10/1996 | Guthrie ....................... 235/385 |
| 5,745,036 A | * | 4/1998 | Clare ....................... 340/572.1 |
| 5,850,416 A | * | 12/1998 | Myer .......................... 375/221 |
| 5,963,134 A | * | 10/1999 | Bowers et al. ........... 340/572.1 |
| 6,056,199 A | * | 5/2000 | Wiklof et al. .......... 235/462.45 |
| 6,094,133 A | | 7/2000 | Shimamura et al. ........ 340/505 |
| 6,172,608 B1 | | 1/2001 | Cole ....................... 340/572.1 |
| 6,232,870 B1 | * | 5/2001 | Garber et al. .............. 340/10.1 |
| 6,371,375 B1 | * | 4/2002 | Ackley et al. ......... 235/462.45 |
| 6,371,379 B1 | | 4/2002 | Dames et al. ............... 235/493 |
| 6,378,774 B1 | * | 4/2002 | Emori et al. ................ 235/492 |
| 6,433,671 B1 | | 8/2002 | Nysen ..................... 340/10.41 |

FOREIGN PATENT DOCUMENTS

| | | | | |
|---|---|---|---|---|
| EP | 1 164 535 A1 | | 12/2001 | ............ G06K/7/00 |
| JP | 2001101369 A | * | 4/2001 | .......... G06K/19/07 |
| WO | WO 95/01062 | | 1/1995 | ............ H04Q/1/00 |

OTHER PUBLICATIONS

PCT Search Report for PCT/US 03/03286, 8 pages, Jun. 10, 2003.
Pending patent application No. 10/033,080 filed Dec. 26, 2001 entitled "Semiconductor Article Harmonic Identification,", 21 total pages.

* cited by examiner

Primary Examiner—Michael G. Lee
Assistant Examiner—Uyen-Chau N. Le
(74) Attorney, Agent, or Firm—Baker Botts L.L.P.

(57) ABSTRACT

An article identification system includes a transceiver that generates a request signal and transmits the request signal, where the request signal requests information corresponding to an article. A transponder is coupled to the article, receives the request signal, and generates an output signal in response to the request signal, where the output signal includes information corresponding to the article. A loop antenna proximate to the transponder enhances the output signal. The transceiver detects the enhanced output signal and receives the information corresponding to the article.

18 Claims, 2 Drawing Sheets

ENHANCEMENT ANTENNA FOR ARTICLE IDENTIFICATION

RELATED APPLICATIONS

This application claims benefits under 35 U.S.C. § 119(e) of U.S. Provisional Application Ser. No. 60/354,398, entitled "ENHANCEMENT ANTENNA FOR ARTICLE IDENTIFICATION," filed Feb. 4, 2002, by Gerald L. Ehlers, et al.

TECHNICAL FIELD OF THE INVENTION

This invention relates generally to the field of article identification and more specifically to an enhancement antenna for article identification.

BACKGROUND OF THE INVENTION

Article identification systems generally comprise a reader that captures information about an article by reading a tag affixed to the article. Examples of some article identification systems in the market include bar code scanning systems, magnetic sweeping systems, active transponder systems, and passive transponder systems. Transponder systems have an advantage over other systems in that no direct line of sight is required. Even with that advantage, however, the tag may be read only from distances less than approximately one to two meters. This distance may require close proximity between the reader and the tag, limiting the feasibility of reading a large quantity of articles scattered throughout a large area. Known techniques for increasing the distance from which information may be captured include enlarging the tag, increasing the power of the reader, and enlarging the reader antenna. These techniques, however, may be impractical because governmental regulations restrict the power of the reader and the size of the reader antenna. Additionally, enlarging the tag may not be desirable because doing so increases the cost of the system. Consequently, known techniques of article identification are unsatisfactory in certain situations.

SUMMARY OF THE INVENTION

In accordance with the present invention, disadvantages and problems associated with previous techniques for enhancing article identification may be reduced or eliminated.

According to one embodiment, an article identification system includes a transceiver that generates a request signal and transmits the request signal, where the request signal requests information corresponding to an article. A transponder is coupled to the article, receives the request signal, and generates an output signal in response to the request signal, where the output signal includes information corresponding to the article. A loop antenna proximate to the transponder enhances the output signal. The transceiver detects the enhanced output signal and receives the information corresponding to the article.

Certain embodiments of the invention may provide one or more technical advantages. A technical advantage of one embodiment may be that a loop antenna may be used to enhance the output signal of a transponder. Accordingly, the distance between a transceiver and a transponder may be increased while maintaining the power of the transceiver and the size of a transceiver antenna.

Certain embodiments of the invention may include none, some, or all of the above technical advantages. One or more other technical advantages may be readily apparent to one skilled in the art from the figures, descriptions, and claims included herein.

BRIEF DESCRIPTION OF THE DRAWINGS

For a more complete understanding of the present invention and its features and advantages, reference is now made to the following description, taken in conjunction with the accompanying drawings, in which.

DETAILED DESCRIPTION OF THE DRAWINGS

Embodiments of the present invention and its advantages are best understood by referring to FIGS. 1 through 6 of the drawings, like numerals being used for like and corresponding parts of the various drawings.

Figure 1:
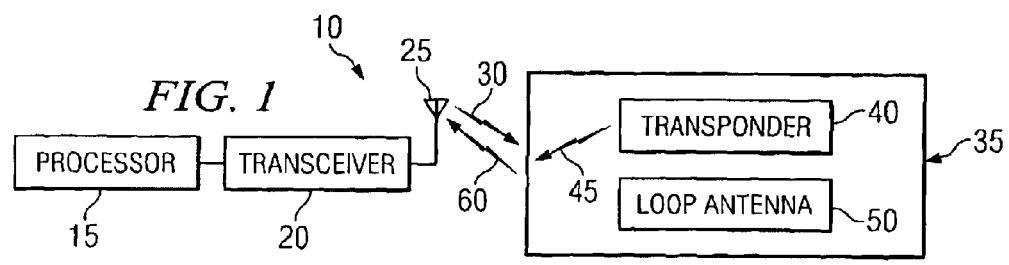
FIG. 1 is a block diagram illustrating an embodiment of an article identification system.

FIG. 1 is a block diagram illustrating a system 10 for article identification. In general, a loop antenna 50 of system 10 enhances the request and output signals of a transponder 40 for article identification, which may increase the distance from which a transceiver 20 can read a transponder 40. According to the illustrated embodiment, system 10 comprises a processor 15, a transceiver 20, a transceiver antenna 25, an article 35, a transponder 40, and a loop antenna 50, coupled as shown in FIG. 1. In operation, transceiver 20 generates a request signal 30 for requesting information corresponding to article 35. Article 35 is equipped with transponder 40 and loop antenna 50. Transponder 40 comprises information corresponding to article 35 and communicates the information using an output signal 45. Loop antenna 50 is placed proximate to transponder 40 to enhance request signal 30 and output signal 45.

Processor 15 manages information corresponding to article 35. As used in this document, the term "processor" refers to any suitable device operable to accept input, process the input according to predefined rules, and produce output, for example, a personal computer, network computer, wireless data port, personal digital assistant, one or more processors within these or other devices, or any other suitable processing device. According to one embodiment, processor 15 may initiate requests for information at transceiver 20.

Transceiver 20 is operable to communicate with transponder 40 to obtain information corresponding to article 35. Transceiver 20 may include a receiver, a transmitter, or any other radio frequency device suitable for communicating with transponder 40. According to the illustrated embodiment, transceiver 20 comprises a reader.

Transceiver 20 is operable to modulate a signal carrier according to any suitable communication protocol. According to one embodiment, transceiver 20 may use a Radio Frequency Identification (RFID) data carrier with an Automatic Data Capture (ADC) technology. Transceiver 20 may demodulate the RFID carrier in order to obtain the information corresponding to article 35. Transceiver 20 may utilize anti-collision techniques for receiving enhanced output signal 60 from multiple transponders 40. Transceiver 20 may also send the information corresponding to article 35 to the processor 15. Transceiver 20 may use any other suitable technique for communicating with a transponder 40. Additionally, transceiver 20 may transmit signals at any suitable communication frequency, such as Low Frequency (LF), High Frequency (HF), Ultra-High Frequency (UHF), or microwave frequency. According to the illustrated embodiment, transceiver 20 is operable to transmit at 13.56 MHz in the Industrial, Scientific, and Medical (ISM) frequency band. Other frequencies may be used by transceiver 20 to communicate with transponder 40 without departing from the scope of this invention.

Transceiver antenna 25 detects signals for transceiver 20 and radiates signals received from transceiver 20. Transceiver antenna 25 may comprise a conductor, a radiating element, a transmission loop, a receiving loop, or any other antenna device suitable for operating in the frequency range of transceiver 20. According to the illustrated embodiment, transceiver antenna 25 comprises a read-write antenna. According to one embodiment, processor 15, transceiver 20, and transceiver antenna 25 are coupled as shown to form a reader apparatus in an RFID system.

Article 35 may comprise any object from which information needs to be obtained. For example, article 35 may comprise a vehicle, where transponder 40 may be coupled to the windshield of said vehicle. As another example, article 35 may comprise objects that need to be monitored, such as cargo, luggage, vehicles, cartons, bins, pallets, grocery store items, or any other suitable object. Any other suitable object may be used as article 35 without departing from the scope of this invention.

Information corresponding to article 35 stored at transponder 40 may include any type of information suitable for identifying article 35. For example, the information may include inventory data, such as the location of a carton along a conveyor belt, storage information, Stockkeeping Unit (SKU) code, the price of the item, or any other information suitable for keeping inventory of article 35, or some, none, or all of the preceding. As another example, the information may include toll road data for a vehicle, such as account number associated with the vehicle, vehicle identification number, license plate of the vehicle, or any other information suitable for identifying a vehicle.

Any process for storing information at transponder 40 may be used. For example, information may be encoded, magnetized, embedded, printed, or processed in any suitable way for storing information at transponder 40. Transponder 40 may be coupled to article 35 using any suitable method for coupling, such as affixing, adhering, pasting, attaching, sticking, fastening, injecting, embedding, welding, or any other process suitable for coupling transponder 40 to article 35. According to the illustrated embodiment, transponder 40 is coupled to article 35 using an adhesive.

Transponder 40 is operable to receive request signal 30 and generate output signal 45 in response. Request signal 30 comprises electromagnetic radiation that may operate to activate transponder 40. According to one embodiment, transponder 40 may comprise a passive transponder that is energized by request signal 30. For example, transponder 40 may comprise an RFID tag. According to another embodiment, transponder 40 may comprise an active transponder operable to generate its own energy.

To generate output signal 45, transponder 40 may comprise a logic, an antenna, any other component suitable for generating output signal 45, or some, none, or all of the preceding. The signal may be generated at the frequency band corresponding to the communication frequency of transceiver 20. For example, transponder 40 may be operable to communicate using 13.56 MHz if transceiver 20 operates in the ISM frequency band. Transponder 40 may use any frequency band suitable for communicating with transceiver 20.

Loop antenna 50 enhances request signal 30 and output signal 45. Loop antenna 50 comprises a conductor such as a wire, conductive ink, etching material, or any other material suitable for conducting an electrical current. Loop antenna 50 may be associated with an inductance L, and may be formed into a resonant circuit. According to the illustrated embodiment, the conductor of loop antenna 50 comprises an elongated conductor forming a loop. The loop may be formed into any shape suitable for enclosing a space significantly larger than the space occupied by transponder 40. For example, the elongated conductor may be formed into a circular loop, an oval loop, a square loop, a rectangular loop, a trapezoidal loop, or any other suitable pattern.

According to one embodiment, the inductance L associated with loop antenna 50 may be approximated using Equation (1):

$$L = \frac{[a(N-1)]^2}{8a + 11w} \; (\mu H) \quad (1)$$

where $\alpha$ is radius of the loop in inches, N is the number of turns in the loop, and w is the width of the loop in inches.

Loop antenna 50 may be associated with a capacitance C. According to the illustrated embodiment, the capacitance C of the conductor of loop antenna 50 may be approximated using Equation (2):

$$C = 2\pi^2 a \varepsilon_r \varepsilon_o \left[ (N - Int(n)) \sum_{n=1}^{N-1} \frac{N-n}{(n+1)(\ln(np) - \ln(r))} + \right.$$
$$\left. (1 - N + Int(N)) \sum_{n=1}^{N-2} \frac{N-n}{(n+1)(\ln(np) - \ln(r))} \right] \quad (2)$$

where $\alpha$ is the mean radius of loop antenna 50, $\in_r$ is the relative dielectric constant, $\in_o$ is the dielectric constant of free space, for example, 8.855 pF per meter, N is the number of turns formed by the conductor, $\rho$ is the pitch (or spacing) between turns, and r is the radius of the conductor.

According to another embodiment, loop antenna 50 may include a tuning capacitor that may be adjusted with reference to the inductance L formed by a loop antenna 50 having one turn. If loop antenna 50 comprises one turn of conductor, the inductance L can be approximated using Equation (3):

$$L \equiv 0.4 \left[ a \ln\left(\frac{2a}{b}\right) + b \ln\left(\frac{2b}{\rho}\right) + 2\sqrt{a^2 + b^2} - \right.$$
$$\left. a \sinh\left(\frac{a}{b}\right) - b \sinh\left(\frac{b}{a}\right) - 2(a+b) + \frac{\mu_r}{4}(a+b) \right] \quad (3)$$

where $\alpha$ is the length of the conductor in meters, b is the width of the conductor in meters, $\rho$ is the radius of the conductor, $\mu_r$ is the relative permeability of the medium, typically a value of one for an air coil, and sinh is the inverse hyperbolic sine function.

The inductance L of the conductor and the capacitance C of the formed loop may result in a resonant circuit operating with a resonant frequency f given by Equation (4):

$$f = \frac{1}{2\pi\sqrt{LC}} \quad (4)$$

Loop antenna 50 produces a magnetic field for enhancing request signal 30 and generating enhanced output signal 60. If exposed to electromagnetic radiation, the elongated conductor of loop antenna 50 generates a current. The current produces a magnetic field that increases the intensity of request signal 30. The magnetic field may also intensify output signal 45, producing enhanced output signal 60. According to one embodiment, the magnetic field increases the intensity of the electromagnetic radiation of request signal 30 to activate transponder 40 at farther distances. According to the illustrated embodiment, the intensity of output signal 45 is enhanced at a multiple between a range of four to five times. The intensities of request signal 30 and output signal 45, however, may not necessarily increase. Enhanced output signal 60 may maintain the intensity of output signal 45 in some circumstances.

Loop antenna 50 may be formed to operate at any resonant frequency. According to the illustrated embodiment, loop antenna 50 operates at a resonant frequency substantially similar to the frequency of transponder 40. For example, loop antenna 50 may resonate at 13.56 MHz, if transponder 40 generates output signal 45 at 13.56 MHz. Loop antenna 50, however, does not necessarily resonate at the same frequency corresponding to the communication frequency of system 10.

Various modifications, additions, or omissions may be made to system 10 without departing from the scope of the invention. For example, loop antenna 50 does not necessarily need to be coupled to article 35 to enhance transponder 40 output. As another example, processor 15 may be omitted. As yet another example, loop antenna 50 may enhance request signal 30 and not output signal 45.

A diagram illustrating one embodiment of a loop antenna is described with reference to FIG. 2. A diagram illustrating one embodiment of a loop antenna intersecting traverse surfaces of an article is described with reference to FIG. 3. A diagram illustrating an embodiment of a loop antenna forming multiple loops is described with reference to FIG. 4. A diagram illustrating one embodiment of a tuned loop antenna on a shelf application for multiple article identification is described with reference to FIG. 5. A flowchart illustrating a method of article identification is described with reference to FIG. 6. "Each" as used in this document refers to each member of a set or each member of a subset of a set.

Figure 2:
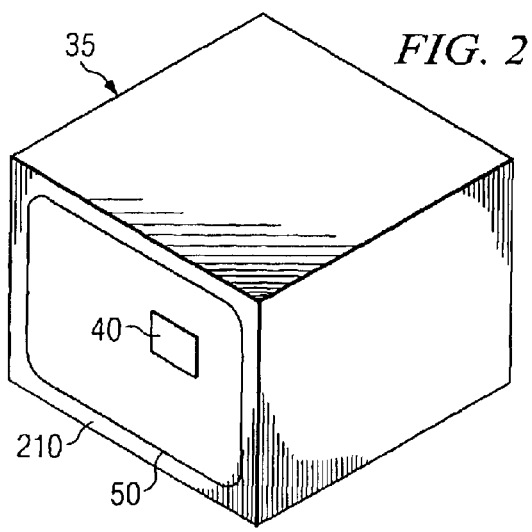
FIG. 2 is a diagram illustrating one embodiment of a loop antenna.

FIG. 2 is a diagram illustrating an embodiment of a loop antenna 50. According to the illustrated embodiment, loop antenna 50 may be coupled to article 35 at a loop antenna surface 210 and proximate to transponder 40. Loop antenna 50 and transponder 40 are located substantially on the same plane as shown in FIG. 2. Loop antenna 50, however, may be coupled to any surface of article 35.

Transponder 40 may be coupled to article 35 anywhere on loop antenna surface 210. According to the illustrated embodiment, transponder 40 is near the conductor of loop antenna 50. Placing transponder 40 at a greater distance from the conductor of loop antenna 50 may yield lower intensities of enhanced request signal 30 and output signal 60, and placing transponder 40 closer to loop antenna 50 may yield greater intensities of request signal 30 and enhanced output signal 60.

Figure 3:
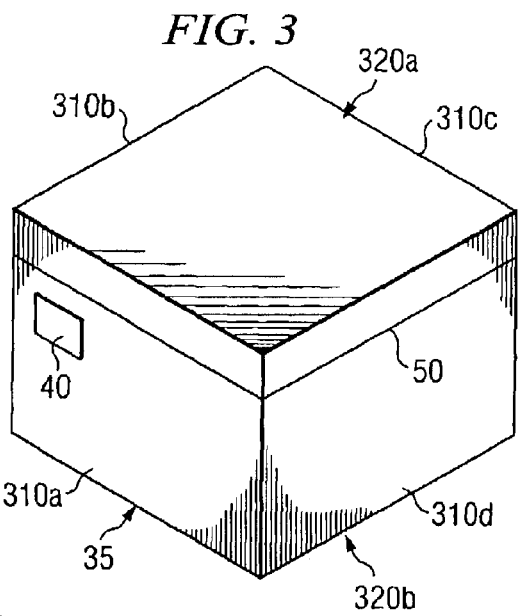
FIG. 3 is a diagram illustrating another embodiment of a loop antenna intersecting traverse surfaces or an article.

FIG. 3 is a diagram illustrating one embodiment of a loop antenna 50 intersecting traverse surfaces 310 or article 35. Loop antenna 50 may be coupled to article 35 such that loop antenna 50 intersects traverse surfaces 310. Any number of traverse surfaces may be intersected by loop antenna 50. According to the illustrated embodiment, loop antenna 50 is looped around traverse surfaces 310 of a box, where each of the traverse surfaces 310 includes a portion of loop antenna 50.

Transponder 40 may be coupled to article 35 proximate to any portion of loop antenna 50. According to the illustrated embodiment, transponder 40 is coupled to article 35 at traverse surface 310a. Transponder 40 may be coupled to any surface of article 35 without departing from the scope of this invention. For example, transponder 40 may be coupled to one of parallel planes 320. In general, the closer transponder 40 is located to loop antenna 50, the greater the intensity of enhanced signals. For example, the intensity of enhanced output signal 60 may be greater if transponder 40 is located at any one of traverse surfaces 310, than if transponder 40 is placed at any one of parallel planes 320.

Figure 4:
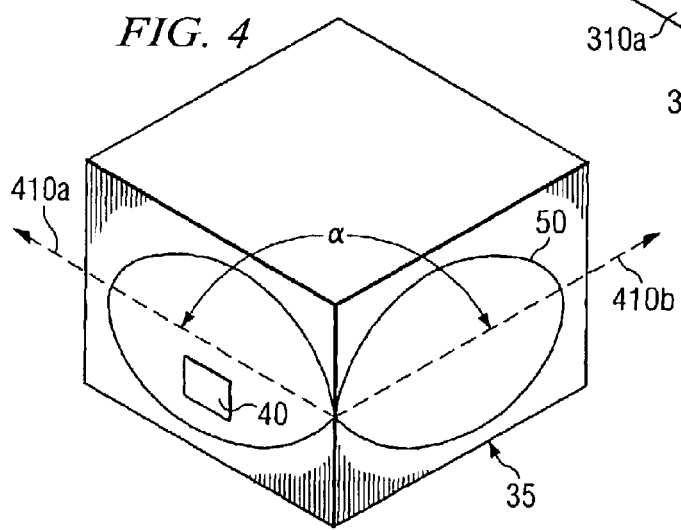
FIG. 4 is a diagram illustrating an embodiment of a loop antenna forming multiple loops.

FIG. 4 is a diagram illustrating another embodiment of a loop antenna 50 forming multiple loops. Article 35 may be equipped with a loop antenna 50 and a transponder 40, shown as coupled in FIG. 4. Loop antenna 50 may be formed into multiple loops to yield multiple loop antenna planes 410. According to the illustrated embodiment, loop antenna 50 includes two loops comprising loop antenna planes 410a and 410b. Loop antenna 50 may form any number of loops without departing from the scope of this invention. Increasing the number of loops at loop antenna 50 increases the number of loop antenna planes, which increases the number of locations where transponder 40 may yield greater intensity of enhanced output signal 60. For example, transponder 40 may be placed along either antenna plane 410a or 410b to yield greater intensity of enhanced output signal 60.

Transponder 40 may be located on any surface of article 35 without departing from the scope of this invention. Following the same principle described with reference to FIG. 2, the intensity of enhanced output signal 60 may be greater if transponder 40 is proximate to the conductor of loop antenna 50. According to the illustrated embodiment, greater intensity of enhanced output signal 60 may result from transponder 40 located proximate to the conductor of loop antenna 50 at any one of the loop antenna planes 410.

Figure 5A:
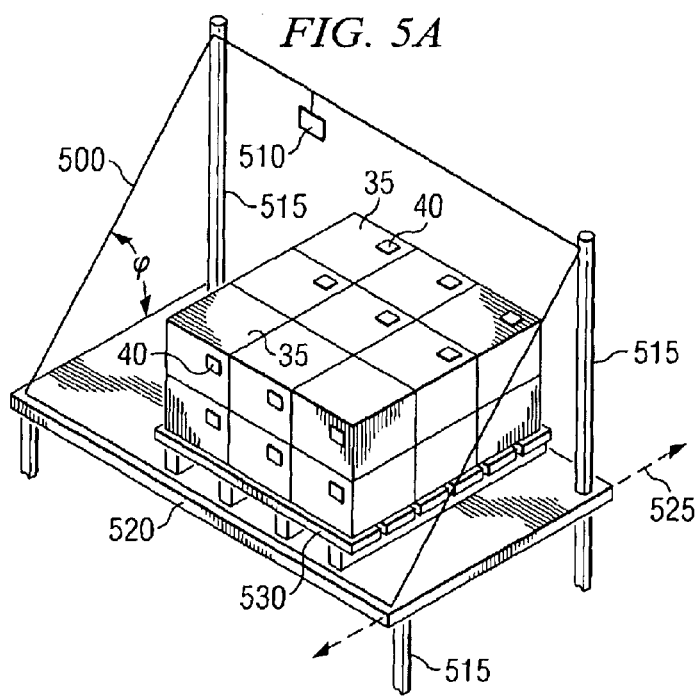
FIGS. 5A and 5B are diagrams illustrating embodiments of a tuned loop antenna installed on a shelf for multiple article identification.
Figure 5B:
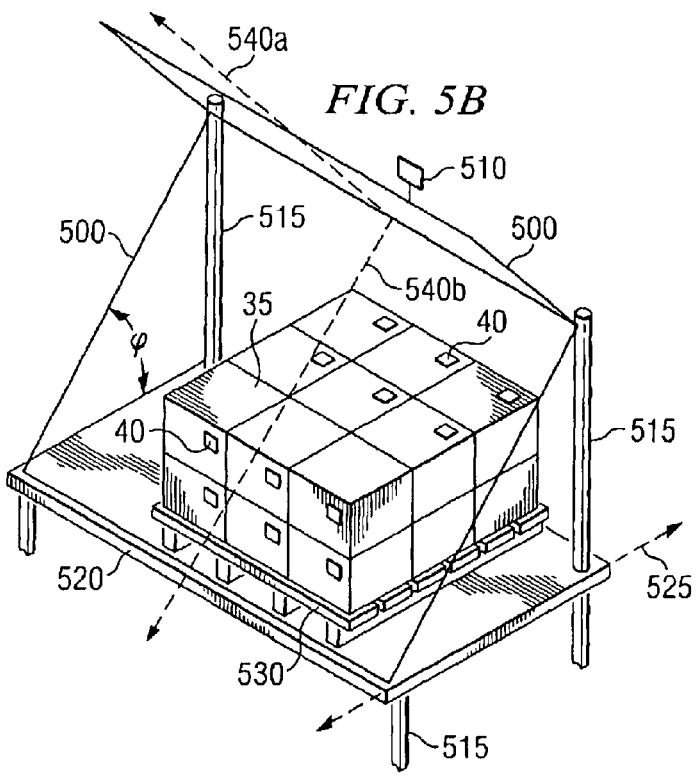

FIGS. 5A and 5B are diagrams illustrating a tuned loop antenna 500 installed on a shelf 520 for multiple article identification. FIG. 5A illustrates tuned loop antenna 500 coupled with a capacitor 510 installed at a shelving unit 515 comprising a shelf 520. Shelf 520 is associated with a shelf plane 525. Tuned loop antenna 500 may be installed parallel to shelf plane 525, perpendicular to shelf plane 525, at a diagonal angle φ with shelf plane 525, or in any other direction suitable for enhancing output signal 45 for multiple transponders 40. According to the illustrated embodiment, tuned loop antenna 500 is coupled to shelving unit 515 at a diagonal angle φ with shelf plane 525. Any number of tuned loop antennas 500 may be used at shelving unit 515 without departing from the scope of this invention. For example, for a shelving unit 515 having multiple shelves 520, each shelf 520 may be equipped with a tuned loop antenna 500.

Tuned loop antenna 500 may be coupled with capacitor 510 to form a resonant circuit operating at a resonant frequency as described by Equation (4) at or near the frequency of transponder 40. Capacitor 510 may comprise any device suitable for adding capacitance to a circuit. According to the illustrated embodiment, capacitor 510 is a tuned capacitor.

Tuned loop antenna 500 may be configured to be proximate to multiple articles 35. According to the illustrated embodiment, each article 35 includes a transponder 40, each transponder 40 producing an output signal 45 enhanced by tuned loop antenna 500. For example, a pallet 530 comprising multiple articles 35, each coupled to a transponder 40, may be surveyed by a system 10 using tuned loop antenna 500 operable to enhance the output of each transponder 40 at pallet 530.

FIG. 5B is a diagram illustrating tuned loop antenna 500 forming multiple loops installed at shelving unit 515. For example, tuned loop antenna 500 may form multiple loops to yield loop antenna planes 540a and 540b. Any number of loops may be used at loop antenna 500 without departing from the scope of this invention. The operation of tuned loop antenna 500 forming multiple loops follows the same principle as described with reference to FIG. 4. For example, greater intensity of enhanced output signal 60 may result from transponders 40 located proximate to the conductor of tuned loop antenna 500 at any one of the loop antenna planes 540.

Figure 6:
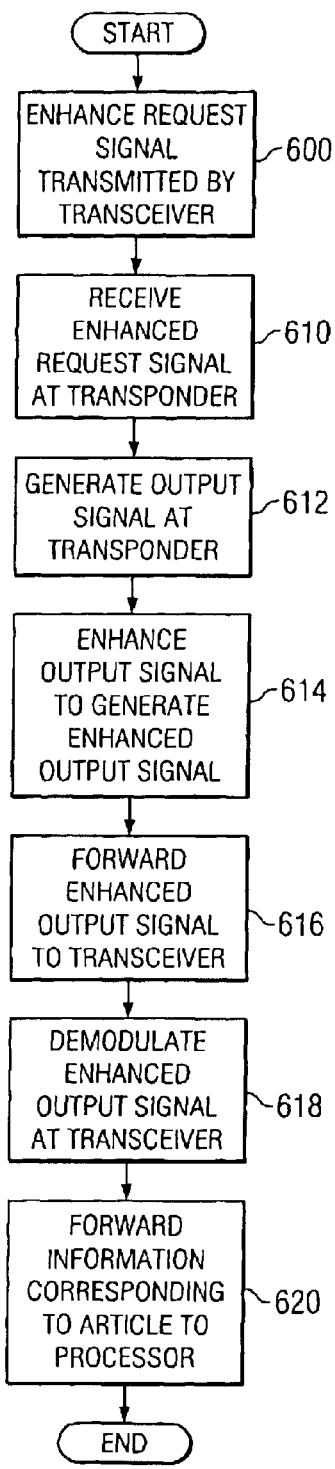
FIG. 6 is a flowchart illustrating a method for article identification.

FIG. 6 is a flowchart illustrating an embodiment of a method of article identification. The method begins at step 600 where loop antenna 50 enhances a request signal 30 transmitted by transceiver 20. Loop antenna 50 detects request signal 30, which may induce a magnetic field in loop antenna 50 that enhances request signal 30.

The method proceeds to step 610 where a transponder 40 receives enhanced request signal 30. In response to the request signal 30, transponder 40 generates an output signal 45 at step 612. Transponder 40 generates output signal 45 comprising information corresponding to article 35. Transponder 40 may generate the output signal as a result of the request signal 30 energizing transponder 40.

The method proceeds to step 614, where a loop antenna 50 enhances the output signal 45 to generate an enhanced output signal 60. According to one embodiment, output signal 45 may cause a current at the elongated conductor of loop antenna 50 resulting in a magnetic field that increases the intensity of output signal 45, producing enhanced output signal 60. According to another embodiment, request signal 30 may also cause a current at the elongated conductor of loop antenna 50 resulting in a magnetic field that may increase the intensity of output signal 45.

At step 616, transceiver antenna 25 detects enhanced output signal 60 and forwards it to transceiver 20. At step 618, transceiver 20 demodulates enhanced output signal 60 to obtain the information corresponding to article 35. Transceiver 20 forwards to processor 15, at step 620, the information corresponding to article 35 for processing, after which the method ends.

Steps may be added, omitted, modified, or performed in any suitable order without departing from the scope of the invention. For example, generating output signal 45 at step 612 may be performed substantially simultaneously with enhancing the output signal at step 614. As another example, step 600 may be modified to include enhancement of any number of signals transmitted by transceiver 40.

Certain embodiments of the invention may provide one or more technical advantages. A technical advantage of one embodiment may be that a loop antenna may be used to enhance the output signal of a transponder. Accordingly, the distance between a transceiver and a transponder may be increased while maintaining the power of the transceiver and the size of a transceiver antenna.

Although an embodiment of the invention and its advantages are described in detail, a person skilled in the art could make various alterations, additions, and omissions without departing from the spirit and scope of the present invention as defined by the appended claims.

What is claimed is:

1. An article identification system, comprising:

a transponder coupled to an article and operable to:
  receive a request signal from a transceiver, the request signal operable to request information corresponding to the article; and
  generate an output signal in response to the request signal, the output signal comprising the information corresponding to the article; and a loop antenna proximate to and separate from the transponder, the loop antenna operable to enhance the output signal, the transceiver operable to detect the enhanced output signal and receive the information corresponding to the article, the transponder coupled to a surface defining a surface plane, the loop antenna comprising one or more loops, at least one loop of the one or more loops disposed on a loop antenna plane distinct from the surface plane.

2. The system of claim 1, wherein the loop antenna is further operable to enhance the request signal; and wherein the transponder is operable to receive the enhanced request signal.

3. The system of claim 1, wherein the loop antenna comprises an elongated conductor operable to conduct a current, the current operable to increase a magnetic field operable to enhance the output signal.

4. The system of claim 1, wherein the transponder comprises a Radio Frequency Identification (RFID) tag.

5. The system of claim 1, wherein the loop antenna comprises a conductor operable to resonate at a resonant frequency substantially equal to a communication frequency associated with the request signal.

6. The system of claim 1, wherein the loop antenna comprises an elongated conductor, the elongated conductor being substantially proximate to the transponder.

7. The system of claim 1, further comprising a plurality of transponders, the plurality of transponders comprising the transponder, each transponder operable to:

receive the request signal; and generate the output signal in response to the request signal; and wherein the loop antenna comprises a tuned loop antenna associated with a capacitor, the tuned loop antenna forming a resonant circuit operable to resonate at a resonant frequency substantially equal to a communication frequency associated with the request signal, the tuned loop antenna operable to enhance the output signal of the plurality of transponders.

8. A method of article identification, comprising:

receiving a request signal from a transceiver, the request signal operable to request information corresponding to an article;

generating an output signal at a transponder in response to the request signal, the transponder coupled to the article, the output signal comprising the information corresponding to the article;

enhancing the output signal using a loop antenna, the loop antenna proximate to and separate from the transponder, the transponder coupled to a surface defining a surface plane, the loop antenna comprising one or more loops, at least one loop of the one or more loops disposed on a loop antenna plane distinct from the surface plane; and sending the enhanced output signal to the transceiver.

9. The method of claim 8, further comprising
enhancing the request signal using the loop antenna; and
receiving at the transponder the enhanced request signal.

10. The method of claim 8, wherein the loop antenna comprises a conductor operable to conduct a current, the current operable to increase a magnetic field operable to enhance the output signal.

11. The method of claim 8, wherein the transponder comprises a Radio Frequency Identification (RFID) tag.

12. The method of claim 8, wherein the loop antenna comprises a conductor operable to resonate at a resonant frequency substantially equal to a communication frequency associated with the request signal.

13. The method of claim 8, wherein the loop antenna comprises an elongated conductor, the elongated conductor being substantially proximate to the transponder.

14. The method of claim 8, wherein generating an output signal at a transponder in response to the request signal further comprises generating a plurality of output signals at a plurality of transponders, the plurality of transponders comprising the transponder, each transponder operable to:
receive the request signal; and
generate the output signal in response to the request signal; and
wherein enhancing the output signal using a loop antenna further comprises enhancing the plurality of output signals, the loop antenna comprising a tuned loop antenna associated with a capacitor, the tuned loop antenna forming a resonant circuit operable to resonate at a resonant frequency substantially equal to a communication frequency associated with the request signal, the tuned loop antenna operable to enhance the plurality of output signals.

15. A system of article identification, comprising:
a means for receiving a request signal from a transceiver, the request signal operable to request information corresponding to an article;
a means for generating an output signal at a transponder in response to the request signal, the transponder coupled to the article, the output signal comprising the information corresponding to the article; and
means for enhancing the output signal using a loop antenna, the loop antenna proximate to and separate from the transponder, the transponder coupled to a surface defining a surface plane, the loop antenna comprising one or more loops, at least one loop of the one or more loops disposed on a loop antenna plane distinct from the surface plane;
means for detecting the enhanced output signal at the transceiver; and
means for receiving the information corresponding to the article.

16. An article identification system, comprising:
a transceiver operable to:
generate a request signal, the request signal operable to request information corresponding to an article; and
transmit the request signal;
a transponder comprising a Radio Frequency Identification (RFID) tag, the transponder coupled to the article and operable to:
receive the request signal; and
generate an output signal in response to the request signal, the output signal comprising the information corresponding to the article; and
a loop antenna comprising an elongated conductor being substantially proximate to and separate from the transponder, the elongated conductor operable to resonate at a resonant frequency substantially equal to a communication frequency associated with the request signal, the elongated conductor operable to conduct a current, the current operable to increase a magnetic field operable to enhance the output signal, the transceiver operable to detect the enhanced output signal and receive the information corresponding to the article, the transponder coupled to a surface defining a surface plane, the loop antenna comprising one or more loops, at least one loop of the one or more loops disposed on a loop antenna plane distinct from the surface plane.

17. An article identification system, comprising:
a transceiver operable to:
generate a request signal, the request signal operable to request information corresponding to an article; and
transmit the request signal;
a transponder comprising a Radio Frequency Identification (RFID) tag, the transponder coupled to the article and operable to:
receive the request signal; and
generate an output signal in response to the request signal, the output signal comprising the information corresponding to the article; and
a loop antenna comprising an elongated conductor being substantially proximate to and separate from the transponder, the elongated conductor operable to resonate at a resonant frequency substantially equal to a communication frequency associated with the request signal, the transponder coupled to a surface defining a surface plane, the loop antenna comprising one or more loops, at least one loop of the one or more loops disposed on a loop antenna plane distinct from the surface plan, each loop being operable to enhance the output signal of the transponder proximate to the elongated conductor of the loop, the elongated conductor of the loop operable to conduct a current, the current operable to increase a magnetic field operable to enhance the output signal, the transceiver operable to detect the enhanced output signal and receive the information corresponding to the article.

18. An article identification system, comprising:
a transceiver operable to:
generate a request signal, the request signal operable to request information corresponding to a plurality of articles; and
transmit the request signal;
a plurality of transponders, each transponder comprising a Radio Frequency Identification (RFID) tag, each transponder coupled to an article of the plurality of articles, each transponder operable to:
receive the request signal; and
generate an output signal in response to the request signal, each output signal comprising the information corresponding to the article of the plurality of articles; and
a loop antenna comprising a tuned loop antenna associated with a capacitor, the tuned loop antenna proximate to and separate from the plurality of transponders and forming a resonant circuit operable to resonate at a resonant frequency substantially equal to a communication frequency associated with the request signal, the tuned loop antenna operable to enhance the output signals of the plurality of transponders by generating a current, the current operable to increase a magnetic field, the transceiver operable to detect the enhanced output signals and receive the information corresponding to the plurality of articles, the transponder coupled to a surface defining a surface plane, the loop antenna comprising one or more loops, at least one loop of the one or more loops disposed on a loop antenna plane distinct from the surface plane.

* * * * *